3,257,496
TAP ENCLOSURE FOR USE WITH UNDERGROUND UTILITY CABLES
Douglas L. P. Hamilton, 3111 W. Mill Road, Milwaukee, Wis.
Filed Jan. 6, 1964, Ser. No. 335,821
1 Claim. (Cl. 174—38)

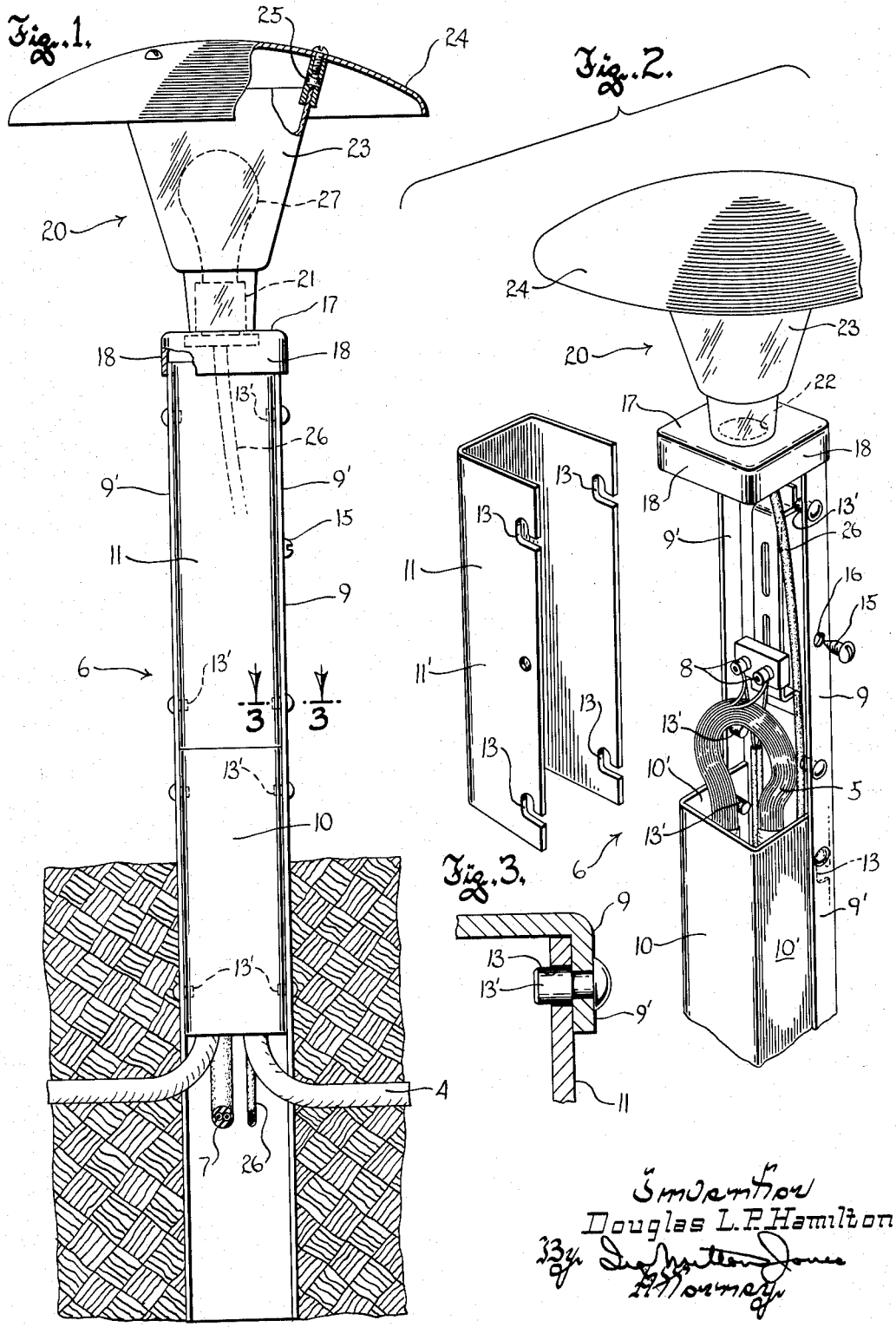

This invention relates to an above ground tap and terminal enclosure adapted to contain and provide protection for the connection of a subscriber's buried lead-in or service line with an underground utility cable; and constitutes an improvement over the tap enclosure of Patent No. 2,916,539, issued December 8, 1959.

While the enclosure of the aforesaid patent has been entirely practical and successful in the applications for which it was intended, it has been found, especially in the case of telephone service, that repairs sometimes must be made to the connections inside the enclosure, and if this has to be done at night illumination of the interior of the enclosure is often a problem.

With this in mind, the present invention has as one of its objects to provide an improved tap enclosure for underground or buried cables which incorporates novel means for illuminating the enclosure.

Another object of this invention is to provide an illuminated tap enclosure which is exceptionally neat and novel in appearance, so that it is especially well adapted for installations where termination is done in front of the home, rather than along the rear easement.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention, constructed according to the best mode so far devised for the practical application of the principles thereof, and in which:

FIGURE 1 is a front elevational view of the tap enclosure of this invention, showing the same in position of use and having parts thereof broken away and in section to better illustrate details;

FIGURE 2 is a perspective view of the enclosure with its cover removed; and

FIGURE 3 is a detail cross sectional view through FIGURE 1 on the plane of the line 3—3.

Referring now particularly to the accompanying drawing, the numeral 4 indicates a buried telephone cable, two wires of which are to be connected with a subscriber's telephone. For this purpose the cable is looped and the loop 5 is brought up into a hollow post-like cabinet, indicated generally by the numeral 6. This post-like cabinet is set into the ground with a substantial portion thereof above ground. At its lower end the cabinet is open to receive the loop 5 and the adjacent end portion of the subscriber's underground lead-in cable 7. The wires of the lead-in cable are connected by means of terminals 8 with the two wires of the cable that carry the particular subscriber's service, it being understood that the cable sheath is removed at the loop 5 to expose the wires of the cable, and that the terminals 8 are mounted in that portion of the cabinet which is above ground.

The cabinet 6 is square in cross section and comprises an elongated channel 9, preferably formed as a stamping, a lower housing section 10, and an upper cover section 11. The sections 10 and 11 are also formed of sheet metal and are U-shaped in cross section. Both have side walls 10' and 11', the edge portions of which are snugly received between the flanges 9' of the channel 9 and detachably connected therewith by bayonet slots 13 in the side walls 10' and 11", and pins 13' fixed to the flanges 9'.

The channel 9 not only forms the back of the cabinet 6 but also serves as an anchor post which may be driven into the ground alongside the cable 4, to a depth such that the bottom of the lower housing section, when in position, is slightly above the cable. This locates the top of the lower housing section at least several inches above the ground.

The detachability of the lower housing section 10 allows the loop 5 of the cable to be brought up into position before the housing section is in place, and of course the removability of the cover section 11 affords ready access to the terminals 8. A screw 15 passing through a hole 16 in one of the flanges 9' and threaded into the adjacent side wall 11' of the cover section, detachably secures the cover section against being shifted longitudinally upwardly as required to enable removal of the cover section; and since the cover section, being of the same cross sectional size and shape as the lower housing section, seats thereon, this one screw 15 holds both sections in place.

At its upper end the cabinet is closed by a top wall or cap 17 which is permanently secured to the channel 9, either by welding or rivets, and has downwardly projecting flanges 18 to encompass the upper end of the cover section 11 when the latter is in position. Mounted on the cap 17 is an electric light fixture, indicated generally by the numeral 20. This fixture includes a conventional lamp socket 21 which is fixed to the cap over a hole 22 therein, a globe 23 and a shade 24, both of which are preferably formed of fiber glass, the globe being white and the shade green. The shade is attached to the globe by three small posts 25 which are fixed to the shade and have bifurcated lower ends that engage over and grip the upper edge of the globe, and the globe is held in place on the cap in any suitable manner.

Current is supplied to the lamp socket 21 by an electric supply line 26 which enters the lower end of the post-like cabinet along with the lead-in cable 7 and is connected with one of the house circuits through a suitable switch, so that a lamp 27 screwed into the socket may be turned on and off at will.

From the foregoing description taken in connection with the accompanying drawing, it will be apparent that this invention provides a unique tap enclosure for underground utility cables, which is especially well adapted for use in installations where the cable is in front of the home rather than along the rear easement. It will also be apparent that the tap enclosure of this invention is not only aesthetically attractive but performs the very useful function of providing illumination both as a yard light and to facilitate the making of night-time repairs to the service installation whenever such repairs are necessary.

What is claimed as my invention is:
A tap enclosure for use with underground utility cables comprising:
(A) a post member having a lower end portion adapted to be driven into the ground adjacent to an underground cable and an upper end portion above ground, said upper end portion being channel-shaped in cross section;
(B) a U-shaped housing section having side walls, the edge portions of which are snugly received between the flanges of the post member, said housing section being of a length to have a portion thereof above ground and another portion thereof below ground;

(C) a U-shaped cover section corresponding in cross sectional shape and size with said housing section and of a length to extend from the upper end of the housing section to the upper end of the post, the edge portions of the side walls of the cover section being snugly received between the flanges of the post member;

(D) means connecting the side walls of said housing section to the post member;

(E) means detachably connecting the side walls of the cover section with the post member, said housing and cover sections coacting with the post member to form an open bottomed elongated cabinet adapted to receive a looped portion of a utility cable and an end portion of a subscriber's lead-in cable;

(F) terminal means fixed to the post member above the upper end of the housing section to be accessible upon removal of the cover section and thereby enable connection of the subscriber's lead-in cable with certain wires of the looped portion of the utility cable;

(G) a cap on the upper end of the post member, said cap having downwardly directed flanges one of which lies flat against and is permanently fixed to the web of the post member to so secure the cap to the post member that the adjacent flanges of the cap are spaced from the flanges of the post member, to accommodate adjacent portions of the cover section which are located between the flanges of the post member and the adjacent flanges of the cap when said cover section is in position, said cap having a hole therein;

(H) an inverted dished hood for the top of the tap enclosure; and (I) supporting means fixed to the cap and joined to the hood to support the hood in spaced relation above the cap and over the hole therein, to keep rain and the elements from entering the enclosure through said hole, and whereby the cap and the hood may coact to provide a mounting and a reflector for an electric light bulb mounted on the cap and connectable with a source of current through the hole in the cap.

References Cited by the Examiner

UNITED STATES PATENTS

| | | | |
|---|---|---|---|
| 342,552 | 5/1886 | Westinghouse | 174—38 X |
| 831,327 | 9/1906 | Daly | 174—45 X |
| 2,916,539 | 12/1959 | Hamilton | 174—38 |
| 3,164,668 | 1/1965 | Skubal | 174—44 X |
| 3,180,920 | 4/1965 | Fletcher et al. | 174—60 X |

FOREIGN PATENTS

| | | |
|---|---|---|
| 730,829 | 6/1955 | Great Britain. |

OTHER REFERENCES

Electrical Construction and Maintenance, Thomas Industries Advertisement, Post Light–9, July 1959, page 144.

Utility Products Co. Advertisement, Utility Products Co., 3111 W. Mill Road, Milwaukee 9, Wis., see Element 4B, Buried Cable Terminal, April 22, 1959.

ROBERT K. SCHAEFER, *Primary Examiner.*

JOHN F. BURNS, *Examiner.*

J. F. RUGGIERO, *Assistant Examiner.*